United States Patent [19]

Horn

[11] Patent Number: 4,628,975
[45] Date of Patent: Dec. 16, 1986

[54] COPY LATHE
[75] Inventor: Robert Horn, Torrensville, Australia
[73] Assignee: Leslie John Geyer, Seaview Downs, Australia; a part interest
[21] Appl. No.: 613,504
[22] Filed: May 23, 1984
[30] Foreign Application Priority Data
  May 24, 1983 [AU] Australia ................. PF9509
[51] Int. Cl.⁴ .................................. B23B 27/00
[52] U.S. Cl. ................................ 142/7; 142/38; 142/56; 29/28
[58] Field of Search ............ 82/14 R, 34 R, 49, 36 R; 29/28; 144/1 R, 47; 142/7, 48, 49, 55, 38, 56
[56] References Cited
  U.S. PATENT DOCUMENTS
  1,149,417  8/1915  Stoddard .................. 29/28
  2,068,625  1/1937  Burton .................... 142/38
  3,277,933 10/1966  Lalli ..................... 81/14 R
  4,200,129  4/1980  Sneed ..................... 142/7
  4,256,155  3/1981  Hochstatter .............. 142/7
  4,491,162  1/1985  Holdahl .................. 142/7

OTHER PUBLICATIONS
Model 3010 Wood Lathe Duplicator Toolmark Co. brochure.

Primary Examiner—Francis S. Husar
Assistant Examiner—Jerry Kearns
Attorney, Agent, or Firm—Brown, Martin & Haller

[57] ABSTRACT

A copy lathe is provided with template supports projecting from both head stock and tail stock which support a template above the bed, and clamp securing the the template to the support means, there being provided a tool holder having a follower guide thereon which extends vertically upwardly from a base, the toe of the base however extending forwardly beyond the follower guide and beneath the template, the tool holder having a tool locked thereinto with the cutting edge of the tool vertically above the follower.

7 Claims, 7 Drawing Figures

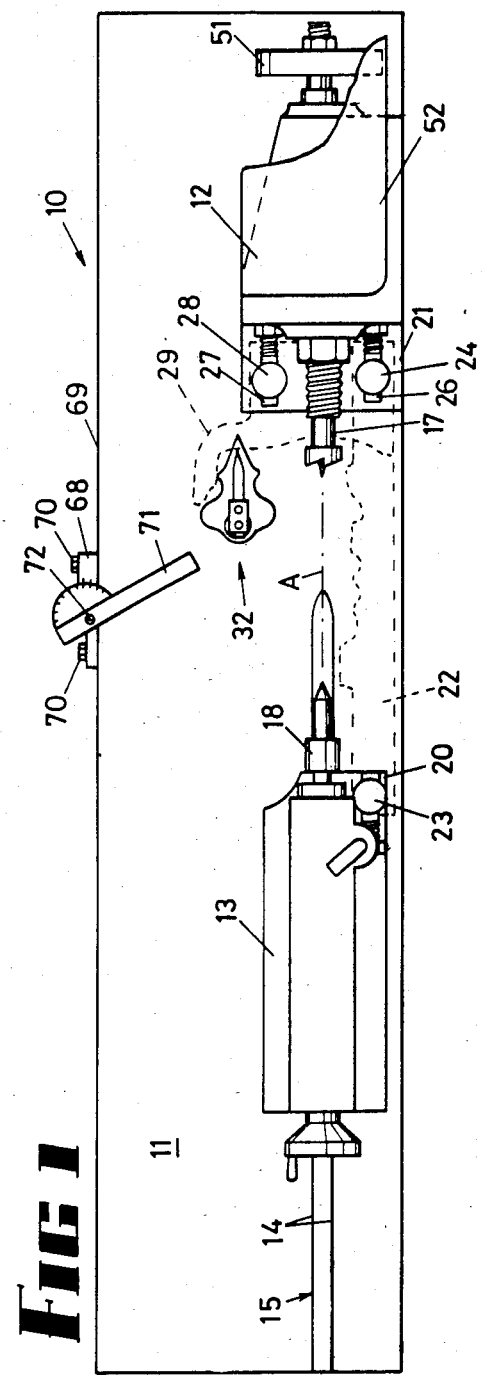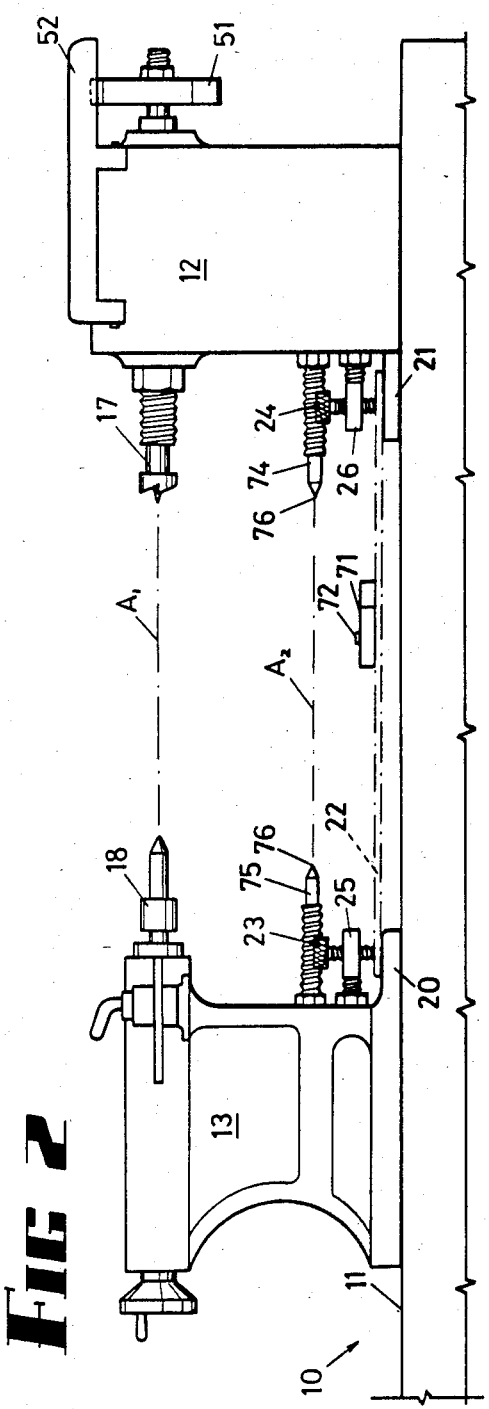

COPY LATHE

This invention relates to a copy lathe which is particularly suitable for wood turning although it can also be used for turning other materials, including certain soft free machining metals, fabricated bakelite and the like.

BACKGROUND OF THE INVENTION

Although highly skilled operators can frequently copy one turned workpiece with another, the copying has minor inaccuracies, and a less skilled operator often has difficulty in making two products look similar, yet it is quite important in many applications that they should have similar appearance, for example the stanchions of a banister or staircase rail.

These problems have been recognised and the reader's attention is directed to the U.S. Pat. Nos. 3,768,527 (Messick) and 4,256,155 (Hochstatter et al). The Messick disclosure shows a flat plate arranged to be secured to a flat lathe bed and to have on it a freely movable tool, the base plate having a first arm that supports a pattern follower and a second arm which supports a second cutting tool above and in vertical alignment therewith. However there is an inherent difficulty in the use of such a tool, in that it is limited to a "short toe", and should the tool "dig in" to the workpiece, it will tend to both tilt about the toe of the base plate and also bend the base plate and column, and a workpiece can be damaged by such an occurrence.

The main object of this invention is to overcome such problems and in this invention the pattern, or template, is supported on surfaces which place it above the bed of the lathe, and the base of the tool holder has its toe projecting forwardly beyond the follower guide and beneath the template.

BRIEF SUMMARY OF THE INVENTION

Briefly in this invention a copy lathe is provided with template supports projecting from both head stock and tail stock which support a template above the bed, and clamp means clamp the template to the support means, there being provided a tool holder having a follower guide thereon which extends vertically upwardly from a base, the toe of the base however extending forwardly beyond the follower guide and beneath the template, the tool holder having a tool locked thereinto with the cutting edge of the tool vertically above the follower.

More specifically, the invention consists of a copy lathe having a flat bed, a head stock on the bed, a tail stock on the bed, a shaft rotatable in the head stock and a sleeve in the tail stock both having a common turning axis, template support means projecting from both said head stock and tail stock, having template support surfaces lying in a common plane above the bed, and clamp means co-operable with both said template support means operable to clamp a template thereto, a tool holder having a vertically extending follower guide thereon, and locking means for locking a tool therein, said tool holder having a flat base the toe of which extends forwardly beyond the follower guide, such that, when a cutting tool is locked in the tool holder and has its cutting point vertically above said follower, reaction of downward pressure applied to the cutting tool when cutting a workpiece is within the area of the base, and the toe lies wholly below said common plane so as to be positionable beneath said template when clamped to said support means.

With this invention the toe of the base of the tool holder is positioned so far forwardly of the tool that the downward reaction, for example due to the tool entering a workpiece by an excessive amount, is within the periphery of the base plate and tilting cannot occur. A surprising degree of rigidity and stability is achieved.

In an embodiment of the invention the flat bed has a tail stock guide slot extending along it, but the toe extends beyond the tool holder follower guide by a sufficient distance to bridge the slot before the follower guide can contact a template, this being the worst condition.

Sometimes it is required to machine a workpiece with a face cut, that is, by moving a cutting tool transversely, for example for producing a bowl or drinking vessel, and in an embodiment of the invention the template support means which projects from the head stock extends across the bed for most or all of the width of the head stock, the head stock is provided with a pair of transversely spaced clamping screws so that the template can be so clamped that its edge to be followed faces the tail stock. The tail stock clamping screw is longitudinally aligned with the rear of the head stock clamping screws.

Sometimes it is desired to avoid making a template and directly copy from a model which may have been itself produced by a turning operation, and to achieve this there can be provided a pair of co-axial pins extending from the head stock and tail stock, at least one of the pins having threaded adjustment means so that it can clamp a model against the other pin, the pins constituting "centres" for retaining the model.

BRIEF DESCRIPTION OF THE DRAWINGS

An embodiment of the invention is described here under in some detail with reference to and is illustrated in the accompanying drawings, in which:

FIG. 1 is a plan view of a copy lathe,

FIG. 2 is a fragmentary elevation of same but drawn to an enlarged scale,

Figure 3:
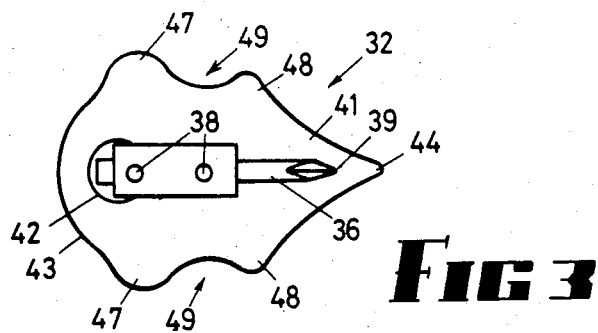
FIG. 3 is a plan view of a tool holder and tool.

In this embodiment a copy lathe 10 is provided with a flat bed 11 and a head stock 12 on the bed 11.

A tail stock 13 also on the bed 11 is guided by the surfaces 14 of slot 15 for longitudinal movement, the head stock 12 having a rotatable shaft 17 journalled in bearings (not shown) in the head stock and the tail stock 13 having a sleeve 18 which is co-axial with the shaft 17 and defines therewith a common turning axis A1 which is parallel to the bed 11 but displaced upwardly therefrom.

A flat plate 20 projects from the tail stock towards the head stock and a second flat plate 21 projects from the head stock towards the tail stock, the plates 20 and 21 having upper surfaces which are template support surfaces to support a template 22 above the bed 11, the template 22 being clamped to the plates 20 and 21 by clamping screws 23 and 24 respectively which are longitudinally aligned with each other, the clamping screw 23 threadably engaging a bracket 25 which extends from the tail stock and the screw 24 threadably engaging a bracket 26 which extends from the head stock. A second bracket 27 also extends from the head stock and carries in it a third screw 24, and is usable for clamping the template 29 when such is used in lieu of template 22, for example for machining a bowl or drinking vessel wherein face cuts are required.

Figure 4:
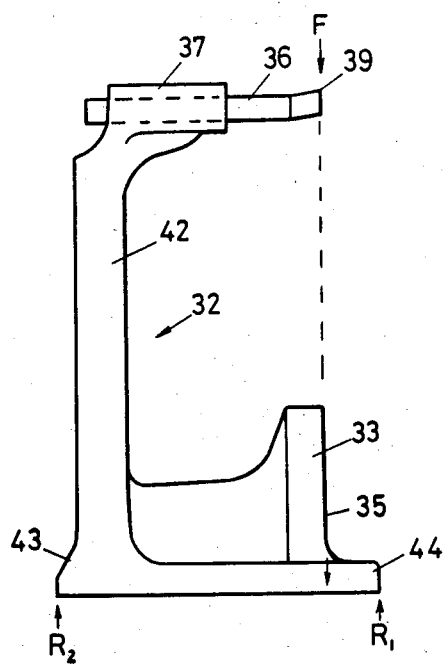
FIG. 4 is an elevation of FIG. 3.
Figure 5:
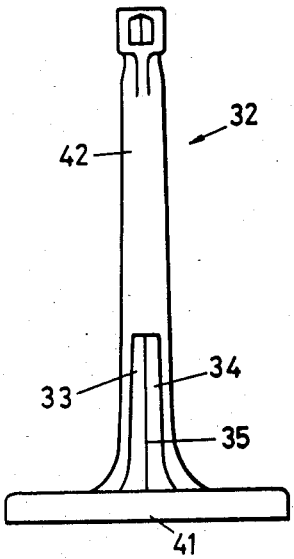
FIG. 5 is an end elevation of FIG. 4.

FIGS. 3, 4 and 5 illustrate details of the tool holder 32 (not shown in FIG. 1) the tool holder 32 having two flat guide surfaces 33 and 34 which converge forwardly to define a vertically extending follower guide edge 35, and the tool holder also has a tool 36 clamped in a forwardly extending tool retaining sleeve 37, the tool being locked into position by a pair of locking screws 38, with the cutting point 39 of the tool being vertically above the follower guide edge 35. The tool holder comprises a base 41 having a post 42 extending upwardly from its heel 43, and joining the tool retaining sleeve 37 is the base 41, the base 41 also having a toe 44 extending forwardly. When downward force "F" is applied to the cutting point 39 of the tool 36 it is resisted by upward reaction against the base 41, this upward reaction extending over the whole area of the base 41 between the toe R1 and the heel R2. The toe 44 extends forwardly sufficiently to bridge the slot 15 of the bed so that stability of the tool holder 32 exists under all conditions of use. The depth of toe 44 is less than the space between template 22 or 29 and the bed 11 so that the toe 44 can extend beneath the templates during turning. The peripheral shape of base 41 is best seen in FIG. 3 and includes a pair of laterally projecting protuberances 47 and 48 on each side, between which is a respective recess 49, this shape being convenient for grasping with either the left or right hand by an operator. The tool can be used at any angle and still faithfully follow its pattern or template. In some embodiments, a thin wall "glove" or cover extends over the nose of the follower guide and, upon removal, enables the tool to make a finish cut the depth of which is only the metal thickness of the glove.

The shaft 17 projects rearwardly from the head stock 12 and has secured to it an abrasive wheel 51 contained under a guard 52 hinged to the head stock, there also being provided a follower location bar 53 having a flat location surface 54 which is parallel to the cutting face of the wheel 51 and is located beneath the cutting zone, the arrangement being such that when the flat guide surface 33 or 34 is located against the location surface 54, the cutting tool 36 can be sharpened along surfaces which converge forwardly corresponding to the convergence of the surfaces 33 and 34. The location bar 53 is clamped by a clamping bolt 56 in the sleeve 57 on a mounting bracket 58 secured to the lathe bed 11, such that the location bar 53 can be retracted as wear on the abrasive wheel 51 reduces its diameter.

Figure 6:
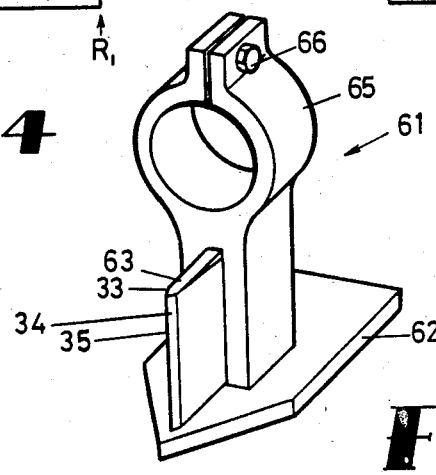
FIG. 6 is a perspective view of an electric tool holder for holding a power tool.
Figure 7:
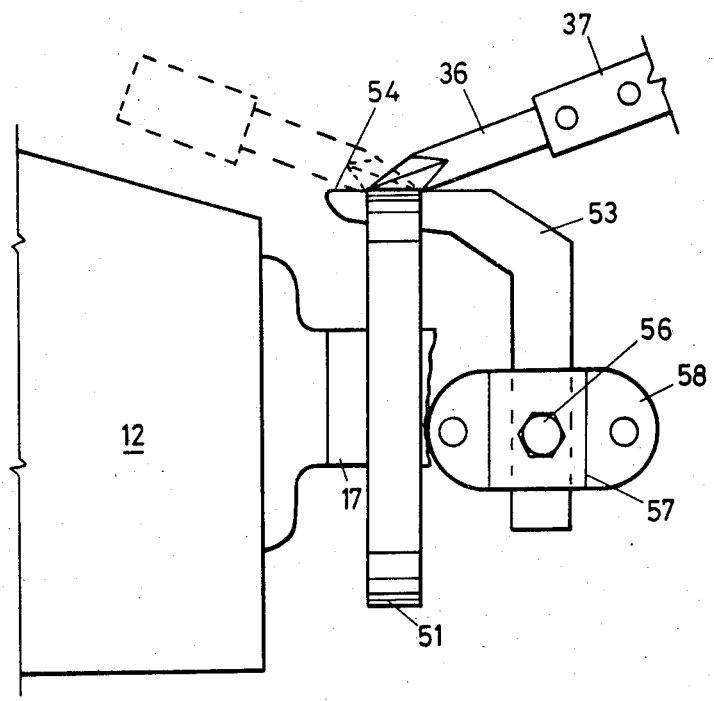
FIG. 7 is a plan view showing a tool sharpening abrasive wheel and follower location bar.

Sometimes there is a requirement to cut grooves in a workpiece, or to draw holes inclined at an angle with respect to the longitudinal axis of the workpiece, and FIG. 6 illustrates a tool holder 61 for an electric tool, the holder 61 having a base 62, a guide plate 63 upstanding from the base and also having a pair of guide surfaces 33 and 34 which converge forwardly to the follower guide edge 35, as in FIG. 4. A bifurcate tool clamp 65 comprises a pair of arms which are arranged to grip an electric tool (for example a drill or router) when drawn together by a clamping screw 66. As shown in FIG. 1, there is provided a mounting block 68 secured to the front edge 69 of the bed 11 by bolts 70, but the bolts engage nuts which bear against a rear surface of a bar (not shown) such that the mounting block 68 can be clamped in any one of a plurality of positions along front edge 69. A guide bar 71 is carried by mounting bracket 68 and adjustable for angle, being locked at a selected angle by a locking screw 72, and this can guide the tool holder 61 to move towards or away from a workpiece at various angles.

Sometimes it is necessary to copy a model instead of copying the shape of a template, and in this embodiment there are provided a pair of co-axial pins 74 and 75 extending respectively from the head stock 12 and tail stock 13, each pin having a pointed end 76, at least the pin 75 threadably engaging its tail stock 13 to provide thread adjustment means for adjusting the distance between pins 74 and 75, the pins lying centrally in the same central vertical plane which contains the head stock shaft and tail stock sleeve, and defining a second axis A2 parallel to and vertically below axis A. A model positioned between the pins 74 and 75 and clamped in that position by actuation of the thread clamping means, is engaged by the follower guide edge 35 as in the case of a template shape being followed.

I claim:
1. A copy lathe having a flat bed, surfaces defining a slot in said bed, a head stock on the bed, a tail stock on the bed, said slot surfaces comprising means for guiding said tail stock for movement along said bed, a shaft rotatable in the head stock and a sleeve in the tail stock both having a common turning axis,
   template support means projecting from both said head stock and tail stock, having template support surfaces lying in a common plane above the bed, and clamp means co-operable with both said template support means operable to clamp a template thereto,
   a tool holder having a flat base having a heel, a pair of laterally projecting protruberances on each side of the heel, and a toe, a post upstanding from the base, a forwardly extending tool retaining sleeve on the upper end of the post, the post having two flat faces extending vertically upwardly from the base and converging forwardly to intersect in an edge which constitutes a vertically extending follower guide, a tool in said tool retaining sleeve having a cutting point which is located vertically above said follower guide edge, locking means locking the tool in said sleeve, said toe being located forwardly of the follower guide for projecting beneath a template clamped to said support means when said follower guide engages the template, the tool holder being symmetrical about a central plane,
   such that, when a cutting tool is located in the tool holder, reaction of downward pressure applied to the cutting tool when cutting a workpiece is within the area of the base under all conditions of use, and the toe and protruberances lie wholly below said common plane so as to be positionable beneath a template clamped to said support means, said lateral protruberances comprising means for spanning said guide slot during face turning.

2. A copy lathe according to claim 1 wherein the surface of said bed is flat, and contains a tail stock slot defined by tail stock guide surfaces which guide the tail stock for movement along the bed, the space between the tail stock guide surfaces being less than the distance by which said tool holder toe extends forwardly beyond the follower guide.

3. A copy lathe according to claim 1 wherein said template support means projecting from said head stock extends across the bed for most of the width of the head stock, and said clamp means comprise a pair of transversely spaced clamping screws threadably engaging brackets projecting from the head stock.

4. A copy lathe according to claim 3 wherein said clamp means comprise a further clamping screw threadably engaging a bracket projecting from the tail stock, said further clamping screw being in longitudinal alignment with one of said head stock clamping screws.

5. A copy lathe according to claim 1 further comprising a pair of horizontal co-axial pins extending respectively from the head stock and the tail stock, each said pin having a central pointed end, at least one of said pins having threaded adjustment means thereon for adjusting the distance of its pointed end from the pointed end of the other pin, said pins lying centrally in the central vertical plane of the head stock shaft and tail stock sleeve.

6. A copy lathe according to claim 1 wherein said lathe shaft extends rearwardly of the head stock but vertically above the lathe bed, a tool sharpening abrasive wheel on the lathe shaft rearward extension, a follower location bar having a flat locating surface, clamping means clamping that bar to the lathe bed vertically beneath the cutting zone of the abrasive wheel, such that when the tool holder is moved across the bed to bring a said flat guide surface into contiguity with said flat locating surface, a side edge of said tool is brought into contact with the abrasive wheel, and said contact sharpens the tool along surfaces which are coplanar with respective said flat faces.

7. A copy lathe comprising:
a flat bed having a guide slot extending along it, a head stock and a tail stock on the bed, said tail stock having means for engaging said guide slot for guided movement along said bed, a shaft rotatable in said head stock and a sleeve in the tail stock both having a common turning axis, template support means projecting from both said head stock and said tail stock for supporting a template above said flat bed, said template support means having template support surfaces lying in a common plane above the bed and clamp means cooperable with both said template support means for clamping a template thereto with its axis aligned with said turning axis, and further template clamping means for clamping a template to one of said support surfaces to extend transverse to said turning axis for a face cutting operation, a tool holder having a flat base for moving along said flat bed, the base having a heel, a toe, a post upstanding from the base, a forwardly extending tool retaining sleeve on the upper end of the post, the post having two flat faces exending vertically upwardly from the base and converging forwardly to intersect in an edge which comprises a vertically extending follower guide, a tool in said tool retaining sleeve having a cutting point which is located vertically above said follower guide edge, locking means for locking said tool in said sleeve, said toe projecting forwardly of said follower guide and having a vertical thickness less than the height of said common plane above said bed, said toe comprising stabalizing means for projecting below a template clamped to said support means during turning, and for projecting below a template clamped to said further support means during face turning, said heel having a pair of lateral protruberances at each side, the width of the heel in the region of said protruberances being greater than the width of said guide slot.

* * * * *